A. BARTELS.
APPARATUS FOR THE MANUFACTURE OF TRANSPARENT HORN LIKE CASEIN MASSES.
APPLICATION FILED FEB. 16, 1916. RENEWED APR. 22, 1920.

1,375,624. Patented Apr. 19, 1921.

Inventor
A. Bartels.
By
Attorney

UNITED STATES PATENT OFFICE.

AMANDUS BARTELS, OF HARBURG-ON-THE-ELBE, GERMANY.

APPARATUS FOR THE MANUFACTURE OF TRANSPARENT HORN-LIKE CASEIN MASSES.

1,375,624. Specification of Letters Patent. Patented Apr. 19, 1921.

Application filed February 16, 1916, Serial No. 78,629. Renewed April 22, 1920. Serial No. 375,911.

*To all whom it may concern:*

Be it known that I, Dr. AMANDUS BARTELS, a subject of the King of Prussia, residing at Harburg-on-the-Elbe, Buxtehuderstrasse 102, in the Kingdom of Prussia, German Empire, have invented certain new and useful Improvements in Apparatus for the Manufacture of Transparent Horn-like Casein Masses, of which the following is a specification.

It has already been proposed to produce transparent horn-like casein masses by first dissolving the casein in caustic alkali, then allowing the solution to settle in order to free it from the particles contained in suspension therein, and then obtaining the casein by precipitation from the resulting clear solution. Although that method is suitable for the production of transparent horn-like masses, yet as the casein is decomposed by the treatment with alkali and consequently loses partly its original properties, in working up the casein to form plastic masses, various drawbacks have been experienced which have not been remedied hitherto. Further, that process entails a great loss of casein.

It has hitherto not been possible to produce remuneratively on a large scale such transparent horn-like masses from undecomposed casein.

I have now discovered that also undecomposed casein will produce useful and completely transparent casein masses if the casein is first treated in a suitable manner with fat solvents. The selection of such solvents as well as the manner of treating the casein with them, is of extreme importance.

The improved process now consists in treating dry commercial casein for a considerable time with energetic stirring with an extracting agent in heat and treating the product in the usual manner after drying.

It has already been proposed to deprive casein of its fat by means of fat solvents; it has however been found that a complete deprivation of fat encounters great difficulties. It has been proposed to employ for instance, ether-alcohol as an agent for depriving casein of its fat. On account of the low boiling point of ether ether-alcohol can only be employed at ordinary temperatures for removing fat, and in such a case no casein is produced which yields a transparent horn-like mass. What is known as chemically pure casein which has been deprived of its fat according to this ether-alcohol process and which is placed on the market as being completely free from fat, consequently does not produce transparent casein masses.

The problem of producing really transparent casein masses in a very easy manner on a commercial scale from undecomposed casein has therefore been only solved now by the new process for which the apparatus is the object of the present invention. The applicant has discovered that mixtures of alcohol ("spirit")—benzin and alcohol ("spirit")—benzol are extremely suitable for use in effecting a proper preparation of the casein, without changing the quality of the latter. There are certainly a large number of other fat-removing agents but their use has always been accompanied with some drawbacks, either that the quality of the casein was deteriorated thereby or that the extracting agent did not penetrate sufficiently deeply into the casein.

In carrying the improved process into practice it is first ascertained by means of tests how long the treatment of the particular casein with the alcohol mixture must be continued. After having thus ascertained the minimum time for the determined operation, which may under certain circumstances be six hours and sometimes longer, the treatment of the casein is then carried into effect accordingly. The casein is mixed in an extracting vessel in which the mixture is kept energetically stirred, with a sufficient quantity of the alcohol mixture; the solvent in the extracting vessel being renewed from time to time until the completion of the operation. The separated extracting liquid is used after distillation for treating further quantities of casein.

The mixtures of alcohol with benzol or benzin have in this process the particular advantage that the constituents pass over together in the distillation, and the distillate can be used again directly for the same purpose.

After having been sufficiently treated with the extracting agent, the casein still moist with the latter, is dried by means of heat and vacuum.

As regards plastic properties, elasticity and workability by tools (turners' tools), the transparent horny mass produced from the casein that has undergone the described preliminary treatment, has exactly the same properties as the mass made from the corresponding commercial casein.

I have further discovered, especially in treating large quantities of casein, that the process can be considerably improved by agitating dry commercial casein with the solvent in a rotating extracting vessel, said solvent being renewed if necessary; whereupon after the discharge of the extracting agent, the casein is heated in the rotating vessel with energetic movement in a vacuum for the purpose of drying and is then treated further in the usual manner to produce artificial masses. This process not only considerably diminishes the requisite duration of the treatment, and produces an artificial horn-like mass which is perfectly transparent even in layers of considerable thickness, but it also allows of producing a useful transparent casein mass on a commercial scale by the use of strong alcohol alone.

In carrying out the process, use is made of a cylinder provided with straining holes which is mounted to rotate on a horizontal axis in a vessel which can be closed air-tight and which is provided with a heating apparatus. This vessel serves to receive the extracting agent. An outlet is provided for the spent extracting agent, and an inlet is provided for the fresh extracting agent. The rotating internal vessel is charged with the necessary quantity of granular casein and is then revolved rapidly on its axis in the heated outer vessel which contains sufficient extracting agent. The extracting agent is discharged and fresh agent is supplied from time to time.

A particular advantage of this modification is that after sufficiently treating the granular casein with the extracting agent, the casein can be dried by means of this apparatus with the greatest safety without any loss of extracting agent and in the most simple and rapid manner, after the extracting agent that was last used has been run off. For this purpose the inner chamber is placed in communication with a vacuum. By revolving the inner vessel charged with casein at a good speed, under the simultaneous influence of heat and vacuum, the casein is quickly dried and the remainder of the extracting agent which is present in and on the casein, is recovered. The treatment with the extracting agent and the drying of the casein are thus united in one operation.

The success of the above described process is no doubt due above all to the fact that each grain of casein is treated as uniformly as possible and as thoroughly as possible with the extracting agent. Namely, all the grains, even those which resist most to the action of the extracting agent, are treated as thoroughly as possible. Any other kind of movement of the casein with the extracting agents certainly renders this uniform action of the extracting agent upon each grain of casein much more difficult, perhaps prevents it altogether. Even a few traces of left-over constituents are sufficient to affect the result unfavorably.

A suitable construction of the apparatus for carrying out the improved process of this invention is illustrated by way of example in the accompanying drawings in which:—

Figure 1:
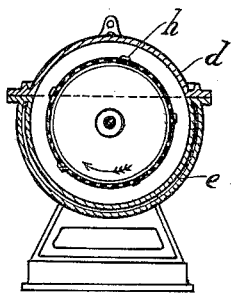
Figure 1 is a cross section.
Figure 3:
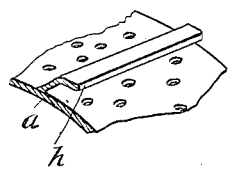
Fig. 3 is a detail perspective view of a portion of the drum.
Figure 4:
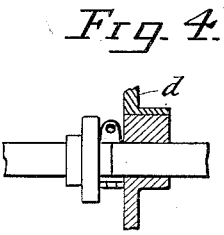
Fig. 4 is an enlarged detail conventional form of coupling for the sectional drum shaft.
Figure 2:
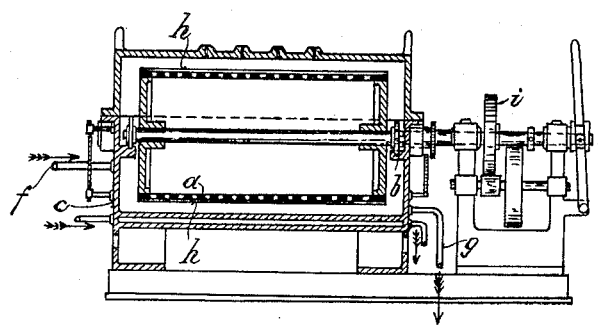
Fig. 2 is a longitudinal section of the apparatus.

The strainer drum $a$ is mounted to rotate in ball bearings $b$ in the lower half $c$ of the liquid-containing cylinder. The upper part $d$ of the cylinder is constructed as a removable cover and allows of effecting a tight closure. The lower part $c$ of the cylinder is provided with a heating jacket $e$ which, if desired, may also be used as a cooling jacket. The solvent liquid is supplied at $f$ and passes out at $g$.

The strainer drum is provided on its periphery with elongated cups $h$ and is rotated by means of driving mechanism $i$.

As the strainer drum rotates, the solvent contained in the cylinder $c$ is carried up by the scooping channel $h$, so that the liquid falls back through the straining cylinders into the agitated material which is being subjected to extractive treatment. At the same time however, any solvent which has entered the lower half of the strainer drum, is carried up by the rotation of the drum and is mixed and brought into contact energetically with the material under treatment. A heating or cooling agent is introduced into the jacket $e$ according to requirement.

By reason of the open-topped construction of the mounting and the division of the drum shaft, the strainer drum $a$ can be removed after opening the cylinder cover $d$. The connection of the parts of the divided shaft is effected by means of a suitable coupling. For the purpose of enabling the drum when removed to be rapidly filled and emptied, one end wall of the same is made wholly or partly removable. This arrangement also allows in an extremely simple manner, of utilizing the apparatus as an apparatus for drying the material to be treated, for which purpose drying air is passed through the cylinder and the strainer drum instead of the liquid solvent.

I claim:

1. In an apparatus for manufacturing transparent horn-like casein, the combination of a closed receptacle divided horizontally to form a removable upper portion and a stationary lower portion, the stationary lower portion being hollow to provide a chamber for heating or cooling the interior of the receptacle, inwardly extended alined bearings on the inside of the receptacle, a shaft mounted adjacent one of the bearings, means for rotating the shaft, a perforated drum, a shaft on which the perforated drum is mounted, said latter shaft being extended beyond the ends of the drum and supported in the bearings, a coupling between one end of the last mentioned shaft and the first mentioned shaft whereby to permit the removal of the drum when the cover is removed from the receptacle, and elongated cups on the drum to lift liquid contained in the receptacle to percolate through the perforations and treat casein contained in said drum.

2. In an apparatus for manufacturing transparent horn-like casein, the combination of a closed receptacle, means for heating or cooling the receptacle, a removably mounted perforated drum inclosed in and spaced from the walls of the receptacle, a plurality of elongated cups on the periphery of the perforated drum adapted to elevate liquid contained in the receptacle, whereby the liquid will percolate through the perforations and into the drum to treat casein contained therein.

In testimony whereof I affix my signature in presence of two witnesses.

Dr. AMANDUS BARTELS.

Witnesses:
    Francis R. Stewart,
    Dorothy Greenop.